United States Patent Office 3,339,305
Patented Sept. 5, 1967

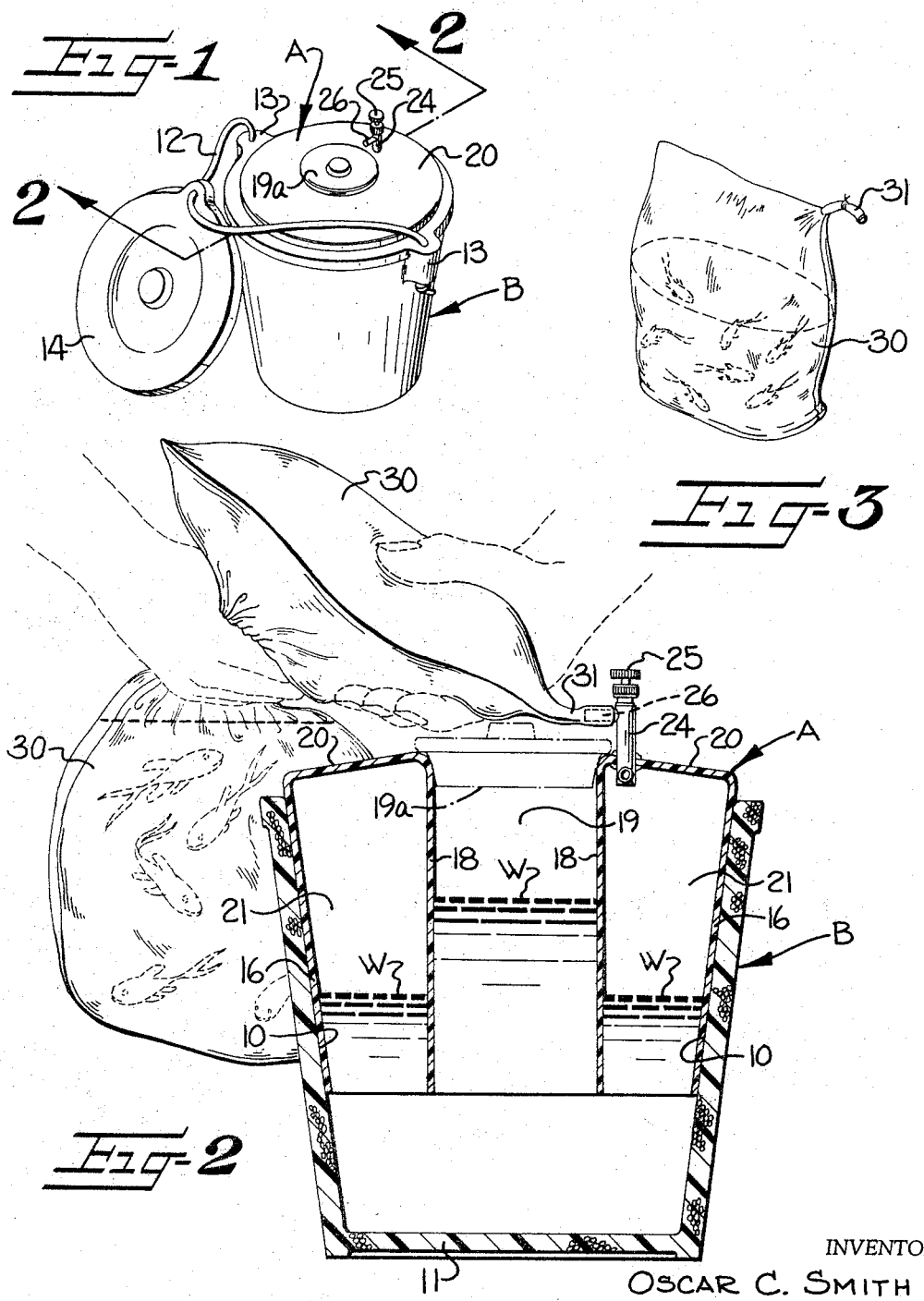

3,339,305
LIVE BAIT BUCKET ADAPTER
Oscar C. Smith, Box 207, Newton, N.C. 28658
Filed Aug. 9, 1965, Ser. No. 478,228
1 Claim. (Cl. 43—56)

ABSTRACT OF THE DISCLOSURE

A device adapted to be frictionally received in tapered wall buckets of a wide variety of sizes and having a chamber provided with a valve for introducing oxygen into the chamber to provide a confined pocket of oxygen above a supply of water in the bucket for sustaining the life of live bait such as minnows.

This invention relates to a live bait bucket and more particularly to an adapter which may be easily inserted into and removed from the open top of a conventional bucket so that live fish bait, such as minnows, can be carried and kept therein for extended periods of time.

Minnows are usually packaged and sold in sealed flexible plastic bags with a supply of water therein and the upper portion of the bag is filled with oxygen. This oxygen supply in the plastic bag is provided to sustain the minnows for extended periods of time and when the bag is opened and the minnows are placed in a regular minnow bucket, the supply of oxygen in the bag escapes and is wasted.

With the foregoing in mind, it is a primary object of the present invention to provide an adapter of the type described which may be placed in a conventional bucket for collecting the oxygen supply from the plastic bag and retaining it in the adapter so that it may be used to sustain the minnows after they are transferred to the bucket.

It is a further object of this invention to provide an adapter element of the type described which provides an economical means for retaining a pocket or chamber of oxygen above the water level in the bucket whereby the oxygen supply is easily accessible for nibbling by the minnows therein.

It is a more specific object of the present invention to provide an adapter of the type described that is of a one-piece construction and that has an inwardly tapering outside annular wall which is adapted to engage the inwardly tapered inside wall of various size conventional buckets to support the adapter in the bucket and to permit the adapter to be easily inserted into and removed from the open top of the bucket.

Some of the objects of the invention having been stated, other objects will appear as the description proceeds, when taken in connection with the accompanying drawings, in which:

FIGURE 1 is an isometric view of the adapter of the present invention and illustrating the same in position inside the upper portion of a conventional bucket;

FIGURE 2 is an enlarged vertical sectional view through the bucket, being taken substantially along the line 2—2 of FIGURE 1, and illustrating the manner in which the oxygen is transferred from the plastic minnow bag into the adapter and retained in the oxygen pocket above the water level;

FIGURE 3 is an isometric view of a plastic bag with a supply of minnows therein, illustrating the manner in which the minnows are usually sold.

The adapter of the present invention is broadly indicated at A and shown positioned in the upper portion of a conventional type vessel or bucket, broadly indicated at B. The bucket B has an open top and an inwardly tapered annular inside wall 10 which extends down to and is connected to a bottom wall 11. The outside portions of the side walls of the bucket B may be tapered or straight and these walls may be of any desired thickness. The bucket B is preferably formed of molded polyurethane foam material which is lightweight and has superior insulation qualities.

As shown in FIGURE 1, the bucket B has a carrying handle 12 which is shown as being formed of a rope that is connected at opposite ends to enlarged handle supporting portions 13. A lid or cover 14 is preferably supported on the rope handle 12 so that it may be used to cover the bucket B when the adapter element A is removed from the bucket B so that the bucket may be used for other purposes. The cover 14 is also preferably formed of molded polyurethane foam.

While the present adapter A is particularly suitable for use with the type of bucket B described above, it is to be understood that the adapter can also be utilized with other conventional type buckets of molded plastic, or metal or the like. The adapter A comprises an outer annular wall 16 having a diameter and an outside taper preferably corresponding to the diameter and taper of the upper portion of the inside wall 11 of the bucket B. Thus, when the adapter A is positioned in the upper end of the bucket B, as shown in FIGURE 2, the abutting tapering surfaces of the annular walls 16 and the inside wall 10 of the bucket B form a support for the adapter A. These two abutting surfaces need not be of sufficient smoothness to form a liquid tight seal therebetween since the lower edge of the outer annular wall 16 extends down into the bucket B a considerable distance, preferably more than half way and below the level of water W maintained in the bucket B.

An inner annular wall 18 is spaced inwardly from the outer annular wall 16 and its lower end preferably terminates at substantially the same level as the lower edge of the outer annular wall 16. Inner annular wall 18 defines a tubular bait introducing and removal access opening 19 in the center of the adapter which is open to the atmosphere. A lid 19a, shown in dash-dot lines in FIGURE 2, may be placed in position in the access opening 19 to prevent the water W from escaping when transporting the bait bucket.

An annular top wall 20 is joined to the upper portions of the outer annular wall 16 and the inner annular wall 18 and forms an annular ogygen retaining pocket or chamber 21 extending between the inner wall 18 and the outer wall 16 and above the water level. As best shown in FIGURE 2, the annular top wall 20 is sloped downwardly and outwardly as it extends outwardly from the upper edge of the inner annular wall 18 to the outer wall 16.

A manually operable valvt 24 is fixed in the annular top wall 20 (FIGURE 2) and includes a rotatable needle valve 25 for opening and closing the valve 24. A branch pipe 26 is provided on the valve 24, for purposes to be presently described.

As shown in FIGURE 3, the minnow supply bag 30 is usually provided with a sealed tube or spout 31 which communicates with the upper portion of the bag 30, and oxygen is contained in the upper portion of the bag and above the water level. In order to transfer the contents of the minnow supply bag 30 into the minnow bucket, the adapter A is placed in the bucket B, as shown in FIGURE 2 and water is introduced into the access opening 19 while the valve 24 is open to permit the escape of air from the pocket or chamber 21 as the water level rises and completely fills the chamber 21. The spout or tube 31 of the minnow supply bag 30 is then unsealed and placed onto the branch pipe 26 of the valve 24 and pressure is applied to the upper portion of the bag 30 to force the oxygen from the bag and through the valve 24 into the oxygen retaining chamber or pocket 21. As the oxygen is forced into the chamber 21, the water will be forced up the opening 19 and flow out of the bucket. After all of the oxygen has been forced out of the bag 30, the valve stem 25 is rotated to close the valve 24, and the hose or tube connection 31 is removed from the branch pipe 26. The upper end of the bag may then be opened and the water and minnows contained therein may be poured into the bucket B, through the access opening 19 in the adapter A. The water level in the access opening 19 will usually be maintained at a slightly higher level than the water in the pocket 21 because of the pressure of the oxygen therein. The oxygen supply from the minnow bag is trapped and retained in the annular chamber or pocket 21 by the annular walls 16, 18, the top wall 20, and the water W. The minnows can then swim around in the water W in the lower portion of the bucket B and may go to the surface of the water in the chamber 21 to nibble the oxygen in this chamber. The minnows may be removed for use from the bucket B by the use of a small net or the like which may be dipped into the water through the opening 19.

When the supply of minnows is exhausted, the adapter A may be removed from the bucket B and the bucket may then be used for any other desired purpose. The adapter A is preferably made of a durable material, such as molded fiberglass, plastic or the like so that it may be readily stored when not in use without danger of breakage.

In the drawings and specification there has been set forth a preferred embodiment of the invention and, although specific terms are employed, they are used in a generic and descriptive sense only and not for purposes of limitation, the scope of the invention being defined in the claim.

I claim:

A device, adapted to be frictionally received in buckets of varying size which have inwardly and downwardly tapered annular side walls, for retaining a pocket of oxygen above a supply of water in the bucket for sustaining live bait, such as minnows, for extended periods of time, said device comprising spaced apart inner and outer annular walls having free lower end portions adapted to extend below the water level in the bucket, an annular top wall connecting said inner and outer walls and cooperating therewith for defining a chamber for retaining oxygen, said annular top wall being wholly within the perimeter of said outer wall, said outer annular wall being substantially uniformly tapered inwardly and downwardly throughout its entire length and adapted to frictionally engage the tapered side wall of a bucket, the length of said outer wall being substantial and the taper thereof being such that the device is received to a deeper extent in larger size buckets than buckets of smaller size, said inner annular wall being of substantially the same length as said outer wall and defining an open-ended passageway for gaining access to minnows in the bucket, and a valve communicating with said chamber for introducing oxygen into the chamber for sustaining the life of live bait in the bucket.

References Cited

UNITED STATES PATENTS

| | | | |
|---|---|---|---|
| 299,690 | 6/1884 | Sherwood | 43—57 |
| 2,757,916 | 8/1956 | Osborn et al. | 43—56 X |
| 3,136,087 | 6/1964 | Scroggins | 43—57 |

SAMUEL KOREN, *Primary Examiner.*

HUGH R. CHAMBLEE, *Examiner.*